(12) United States Patent
Häfele et al.

(10) Patent No.: US 8,606,535 B2
(45) Date of Patent: Dec. 10, 2013

(54) METHOD FOR TEMPERATURE COMPENSATION OF PRESSURE VALUES IN A TIRE PRESSURE CONTROL SYSTEM

(76) Inventors: Ulrich Häfele, Oberderdingen (DE); Michael Dennig, Gaggenau (DE)

( * ) Notice: Subject to any disclaimer, the term of this patent is extended or adjusted under 35 U.S.C. 154(b) by 136 days.

(21) Appl. No.: 11/524,180

(22) Filed: Sep. 20, 2006

(65) Prior Publication Data

US 2007/0073503 A1    Mar. 29, 2007

(30) Foreign Application Priority Data

Sep. 24, 2005   (DE) .......................... 10 2005 045 687

(51) Int. Cl.
*B60C 23/00* (2006.01)
*G06F 19/00* (2011.01)

(52) U.S. Cl.
USPC .............................. 702/98; 73/146.2; 340/442

(58) Field of Classification Search
USPC ..................... 702/98, 99, 130, 136, 138, 140; 341/442; 73/146, 146.2; 340/442, 449
See application file for complete search history.

(56) References Cited

U.S. PATENT DOCUMENTS

| | | | |
|---|---|---|---|
| 4,567,459 A * | 1/1986 | Folger et al. ..................... 346/58 |
| 4,909,074 A * | 3/1990 | Gerresheim et al. ......... 73/146.4 |
| 5,140,851 A | 8/1992 | Hettich et al. |
| 5,228,337 A * | 7/1993 | Sharpe et al. ................ 73/146.5 |
| 5,780,733 A | 7/1998 | Meunier |
| 6,293,147 B1 * | 9/2001 | Parker et al. ..................... 73/462 |
| 6,518,877 B1 * | 2/2003 | Starkey et al. ................ 340/447 |
| 6,775,632 B1 * | 8/2004 | Pollack et al. ................ 702/104 |
| 6,779,392 B2 * | 8/2004 | Bell et al. ..................... 73/146.8 |
| 6,829,925 B2 * | 12/2004 | Nespo et al. .................... 73/146 |
| 6,868,358 B2 * | 3/2005 | Brown, Jr. ..................... 702/138 |
| 2003/0120453 A1 * | 6/2003 | Hayashi et al. ............... 702/140 |
| 2004/0017289 A1 | 1/2004 | Brown, Jr. |
| 2004/0099055 A1 * | 5/2004 | Komatsu et al. ................ 73/146 |
| 2005/0162263 A1 * | 7/2005 | Fennel et al. ................. 340/442 |

FOREIGN PATENT DOCUMENTS

WO     WO2006089626 A1 *   8/2006   ............. B60C 23/04

* cited by examiner

*Primary Examiner* — Bryan Bui
(74) *Attorney, Agent, or Firm* — Orum & Roth, LLC; Keith H. Orum

(57) ABSTRACT

The invention describes a method for temperature compensation of measured pressure values in a tire pressure control system of a vehicle, which is equipped with wheels with pneumatic tires in which a pressure sensor arranged below the tire obtains the pressure values and a temperature sensor arranged below the tire obtains temperature values and the measured pressure values are referred to a predefined reference temperature, giving due consideration to the known proportionality between the pressure and the temperature at a volume of air in the tire which is assumed to be constant. The invention provides that an offset of the temperature supplied by the temperature sensor from the mean air temperature prevailing in the tire is estimated for the temperatures measured at any time in the tire, and the currently measured temperature values are corrected using the estimated temperature offset as a correction value.

9 Claims, 3 Drawing Sheets

Figure 1:
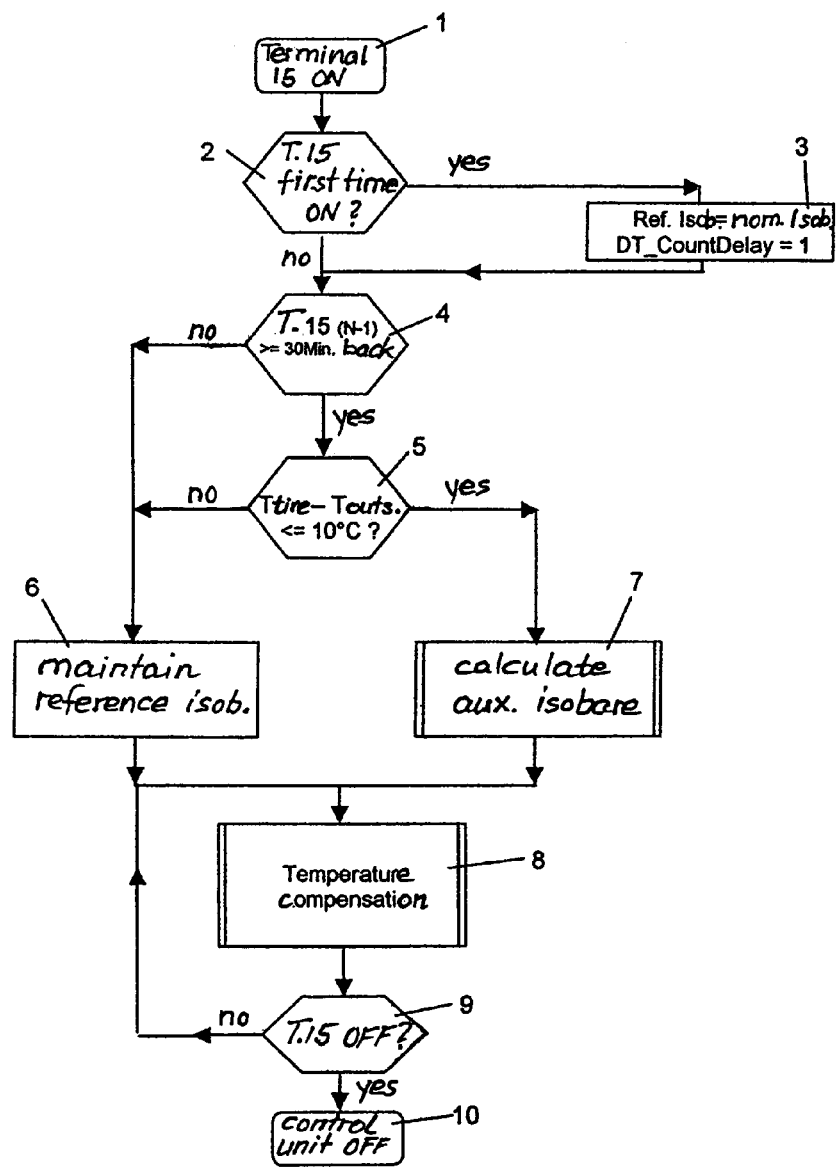

METHOD FOR TEMPERATURE COMPENSATION OF PRESSURE VALUES IN A TIRE PRESSURE CONTROL SYSTEM

The present invention relates to a method for temperature compensation of measured pressure values in a tire pressure control system of a vehicle, which is equipped with wheels with pneumatic tires in which a pressure sensor arranged below the tire obtains the pressure values and a temperature sensor arranged below the tire obtains temperature values and the measured pressure values are referred to a predefined reference temperature, giving due consideration to the known proportionality between the pressure and the temperature at a volume of air in the tire which is assumed to be constant.

A tire pressure control system for carrying out a method of this kind has been known from an article entitled "The TSS tire pressure control system. Now also known for NKW", published in "System Partners", a special edition of DE-ZIATZ/MTZ for the year 2003, which describes a tire pressure control system of that kind for use in commercial vehicles. A battery-powered electronic wheel unit, comprising a pressure sensor and a temperature sensor and measuring the pressure and the temperature in the tire at short intervals, is provided for each tire inside the tire. The measured values, together with a specific identifier of the electronic wheel unit, are transmitted by radio, in the form of data telegrams, to a receiver by which they are converted into an electric signal and are transmitted to a central control unit in the vehicle for evaluation. The control unit evaluates the data telegrams, identifies the sender and decides whether or not the driver should be informed.

Each wheel is monitored separately. For this purpose, the air pressure in the tire is compensated on the basis of the temperature that is measured simultaneously, which means that it is converted to a pressure at a reference temperature of, for example, 20° Celsius. The nominal value of the tire pressure is entered by the driver via a keyboard, or is predefined in the control unit by the manufacturer as a nominal pressure specific for the respective vehicle, in which case possible setting errors by the driver are prevented by a plausibility check and permanent monitoring.

In most of the cases, "bursts of tires" directly follow a rapid pressure loss of, for example, more than 0.4 bar per minute. When a rapid pressure loss sets in, a "hard" warning is immediately issued on a display of the instrument panel of the vehicle. In the case of a pressure drop developing slowly, almost unnoticeably, the driver is provided a "soft" warning, and he is requested to increase the tire pressure at the next opportunity.

The request is issued the first time when the inflation pressure has dropped to a value 0.7 bar below the nominal pressure value, for example. Once the inflation pressure drops below a second threshold, which may have been set at 1.2 bar below the nominal pressure, for example, the driver is again provided a "hard" warning. A hard warning means that the tire pressure should be corrected as quickly as possible, or that a defective tire should be exchanged.

Reliable temperature compensation of the measured temperature values can be achieved only if the temperature of the air in the tire is known with sufficient reliability. The temperature sensor of the electronic wheel unit measures its own temperature, and that temperature should correspond to the air temperature in the tire, if possible. This normally is the case with conventional tires because the flexing action of the tire during motion produces an air flow in the tire likely to bring about a temperature compensation effect. This is, however, no longer guaranteed with a modern tire with integrated emergency running element, which is arranged between the tire and the rim and is intended to allow the wheel to continue running at a limited speed for a limited period of time in case a serious pressure loss should occur.

Given the fact that the electronic wheel unit normally is arranged on the rim base, it is largely screened from the air volume in the tire by the emergency running element.

The emergency running element hinders the air from circulating in the tire and, consequently, also obstructs the temperature compensation process in the air space below the tire. In order to overcome that problem, there have been known emergency running elements provided with scavenging channels intended to facilitate the circulation of air and, thus, the temperature compensation process during flexing of the tire. However, the emergency running element now as before obstructs the circulation of air and the temperature compensation process in the tire. It has been found, for example, that the temperature rise encountered in the tire during movement of the vehicle, due to the thermal conductivity of the rim which is better than the thermal conductivity of the tire, is lower below the emergency running element than above the emergency running element, a fact which is especially well noticeable with aluminum rims that have a substantially better thermal conductivity than steel rims. The temperature sensor placed between the emergency running element and the rim therefore tends to measure a temperature which is lower than the mean air temperature in the tire. This leads to inaccurate temperature compensation of the measured pressure values and, further to undesirable shifting of the warning levels of the tire pressure control system.

Now, it is the object of the present invention to provide a way of improving the temperature compensation of the measured pressure values in the simplest possible way in wheels where irregular temperature distribution is to be expected in the air chamber, especially in tires with an integrated emergency running element, This object is achieved according to the invention by a method for temperature compensation of measured pressure values in a tire pressure control system of a vehicle, which is equipped with wheels with pneumatic tires in which a pressure sensor arranged below the tire obtains the pressure values and a temperature sensor arranged below the tire obtains temperature values and the measured pressure values are referred to a predefined reference temperature, giving due consideration to the known proportionality between the pressure and the temperature at a volume of air in the tire which is assumed to be constant, in which an offset of the temperature supplied by the temperature sensor from the mean air temperature prevailing in the tire is estimated for the temperatures measured at any time in the tire, and the currently measured temperature values are corrected using the estimated temperature offset as a correction value. Advantageous further developments of the invention are the subject-matter of the sub-claims.

According to the invention, an offset of the temperature supplied by the temperature sensor from the mean air temperature prevailing in the tire is estimated for the temperatures measured at any time in the tire. Using the estimated temperature offset as a correction value, the currently measured temperature values are corrected, whereafter temperature compensation is carried out on the current measured pressure values, based on the corrected measured temperature values.

The invention provides the advantage that temperature compensation of the measured pressure values can be improved already by estimation, which latter can be carried out, in the simplest of all cases, based on empirical values.

This not only improves the accuracy and reliability of the pressure monitoring process, especially for tires with an integrated emergency running element, but in fact makes it applicable for the first time to tires with an integrated emergency running element on aluminum rims, and especially to modern super-wide tires where temperature compensation is obstructed by the emergency running element to an especially high degree.

Preferably, correction of the temperature is not obtained from empirical values but is currently derived from the development of the measured pressure values and the measured temperature values during motion of the vehicle. To this end, the development of the measured pressure values and the measured temperature values is observed when the wheels of the vehicle are transferred from a state of rest and of thermal balance to a running condition in which the measured pressure values and the measured temperature values are compared with a predefined reference isochore that indicates for a gas, such as air, the dependence of the pressure on temperature at a volume supposed to be constant, and which is a straight line beginning at zero pressure at the absolute zero temperature.

This preferred further development of the invention provides the advantage that a useful correction value can be obtained for the temperature value measured at any time, by simultaneous observation of the development of the measured temperature values and the measured pressure values, giving due consideration to the gas laws, although the air temperature is measured in the tire at a single point only. The invention is based on the fact that the tire pressure, normalized at a reference temperature, cannot rise beyond a previously set nominal pressure during motion. When the measurements taken by the pressure sensor and the temperature sensor show pressure values above the reference isochore representative the nominal tire pressure, for example, it can be concluded that the temperature measured is excessively low, instead of determining that the measured pressure value is excessively high. The extent by which the temperature measured may be too low can be estimated by finding the point indicating the tire pressure measured on the reference isochore and by then reading the associated temperature, According to the invention, the temperature difference so determined is then added to the measured temperature value whereby a corrected temperature is obtained which is a good approximation to the mean temperature of the air in the tire and which can be used—in the known way, from that point onward—for temperature compensation of the measured pressure value in order to normalize the latter at the reference temperature of 20° Celsius, for example. One thereby achieves good temperature compensation of the measured pressure values even with wheels where temperature gradients have to be expected in the air space of the tire, solely by common evaluation of the measured pressure and temperature values based on a reference isochore for the tire pressure of the respective wheel.

The above explanations show that it is an advantage to derive the correction value of the temperature from the offset between the measured pressure value and the reference isochore. In case measured temperature values below the air temperature in the tire are to be expected at the place of installation of the temperature sensor, which may be the case if the temperature sensor is installed in a tire with an integrated emergency running element between the emergency running element and the rim, forming a heat sink, then the correction values of the measured temperature values are derived in upward direction from the offset of the measured pressure values relative to the reference isochore.

When a predefined nominal pressure prevails in the tire at the reference temperature, one conveniently defines a nominal isochore that indicates the nominal pressure at the reference temperature. Once the nominal pressure has been adjusted in the tire, the nominal isochore conveniently is selected as the reference isochore for determining the correction values for the temperature values measured in the tire.

Tires are subjected to a slowly developing pressure loss. The rate of such development depends on the structure and material of the tire and on the tightness of the valve, and may be different from one wheel to the next, It is necessary that such a slowly developing pressure loss be reliably detected by a tire pressure control system. It is for this reason that the reference isochore in the tire pressure control system for the respective wheel is preferably updated every time the vehicle is restarted after a stoppage period during which the temperature in the tire was permitted to balance so that the vehicle has assumed a state of thermal balance. One thereby ensures that the accuracy of the temperature compensation for the currently measured pressure values will be maintained in spite of the gradual pressure loss.

It is, therefore, of advantage when the vehicle is to be restarted after the end of a trip, after the wheels of a vehicle have assumed a state of thermal balance, to form an auxiliary isochore if one or more of the pressure values of a wheel, measured during the state of thermal balance, are found to lie below the reference isochore used before. The auxiliary isochore is then selected to ensure that the one or more pressure values measured during the state of thermal balance come to lie on the auxiliary isochore. The auxiliary isochore is then used as a new reference isochore. Conveniently, it then replaces the previous reference isochore. However, it is not the intention to replace the nominal isochore, which initially may be used as a reference isochore, by an auxiliary isochore; instead, the nominal isochore should be preserved and should advantageously be used for comparing the current air pressure with the nominal pressure and to warn the driver when a threshold value of the offset between the current pressure and the nominal pressure is exceeded. A suitable pressure threshold to be used for this purpose is 300 mbar to 400 mbar for commercial vehicles, 200 mbar to 300 mbar for passenger cars. Preferably, the nominal isochore is recalculated only when the driver adjusts a new tire pressure and causes the central control unit of the tire pressure control system to perform a calibration process during which the nominal isochore is recalculated by the control unit based on the newly adjusted tire pressure (nominal tire pressure).

If one or more measured pressure values, whose offset from the nominal isochore exceeds a predetermined threshold value in upward direction, are obtained for a wheel in stationary condition, in the state of thermal balance, then the driver is requested to perform a new calibration process, with the effect that the previous nominal isochore is replaced by a new nominal isochore. This is so because an increase in tire pressure of the described type can be interpreted as a refilling operation carried out on the tire for adjusting a new nominal pressure, for example for the purpose of increasing the loading capacity of the vehicle.

Preferably, the offset of the measured temperature value from the temperature derived from the reference isochore for the measured pressure value associated to the measured temperature value derived at the same time is used as a correction value of the temperature. That correction of the measured temperature values can be carried out easily and leads to a very useful result.

All correction values of the temperature are obtained while the vehicle is moving. Once the vehicle is started, which circumstance is determined especially by the fact that the ignition has been switched on, measured pressure values and measured temperature values are preferably obtained at regular intervals and, correspondingly, new correction values of the temperature are derived regularly so long as the offset of the measured pressure values from the reference isochore continues to increase. Once the offset does no longer increase, but remains equal or even drops, the last correction value of the temperature that has been obtained before no further rise of the correction value could be determined, is maintained for the further measurements. It can be ensured in this way that a slowly developing pressure loss will not be compensated and concealed by the generation of correction values of the temperature. However, when the offset of the measured temperature values from the reference isochore starts to rise again, a new correction value of the temperature preferably is formed only when the increase of the offset of the measured pressure values from the reference isochore continues over a predetermined number of successive measurements, preferably for at least three successive measurements, and/or when the increase of the offset of the measured pressure values from the reference isochore exceeds a predetermined value, for example 150 mbar. It can be ensured in this way that accidental momentary pressure variations will not invalidate the temperature compensation of the measured pressure values.

Further, it is of advantage to limit the correction values of the temperature to a predetermined value range, especially in upward direction, as it has been found that the accuracy of the temperature decreases as the correction value rises so that the accuracy will no longer benefit from excessively high correction values. An upper limit of 15° Celsius is preferred for tires with an integrated emergency running element on aluminum rims. For tires with an integrated emergency running element on steel rims, an upper temperature limit of 10° Celsius is preferred.

Limiting the correction value of the temperature in downward direction is equally useful. A lower limit of 2° C. to 3° C. is preferred for the correction value of the temperature. Smaller correction values do not provide an essential benefit with respect to accuracy and safety.

Conveniently, the reference isochore used, once the nominal tire pressure has been adjusted, should initially be the nominal isochore determined by the nominal tire pressure. In order to permit a new reference isochore to be determined when the pressure in the tire had gradually dropped, it is necessary to measure the tire pressure at least once when the tire is in thermal balance, i.e. when temperature compensation has occurred, so that the measured temperature value indicates the temperature of the air in the tire with sufficient accuracy. However, in practice it is not possible, with reasonably input, to measure at the vehicle wheels whether or not temperature compensation has taken place and if the wheel is in a state of thermal balance. For purposes of the invention one therefore preferably simplifies the process by assuming that the wheel is in a state of thermal balance when the ignition system of the vehicle has been switched off for a given period of time, especially for more than 30 minutes, and/or when the measured temperature value has dropped below a predetermined threshold value, especially a threshold value of 35° Celsius; preferably, the two conditions should be fulfilled together. Any irregularities in the distribution of the temperature that may then still be left would then seem to be acceptable.

More favorably, it can be assumed in a simplified way that a wheel is in a state of thermal balance when the ignition system of the vehicle has been switched off for a predetermined period of time and/or when the deviation of the temperature measured in the tire from the temperature of the air outside the tire has dropped below a predetermined threshold, preferably a temperature threshold of 10° Celsius. This procedure provides the advantage that the accuracy of temperature compensation does not depend on the ambient temperature as the latter is measured separately. This can be done generally without any particular expense, as modern vehicles normally are equipped with an ambient temperature sensor. When the vehicle has not been moved for at least 30 minutes, with the ignition switched off, and when the difference between the temperature measured by the temperature sensor in the electronic wheel unit and the temperature measured by the ambient air sensor does not exceed 10° C., then the temperature gradient remaining in the wheel cannot be more than insignificant and can be neglected for purposes of temperature compensation of the measured pressure values.

The reference temperature used for normalizing the measured pressure values by temperature compensation may be a fixed temperature, for example 200 Celsius, or else may consist of the measured value provided by the ambient temperature sensor while the wheels of the vehicle are in a state of thermal balance.

In the drawings

Figure 2:
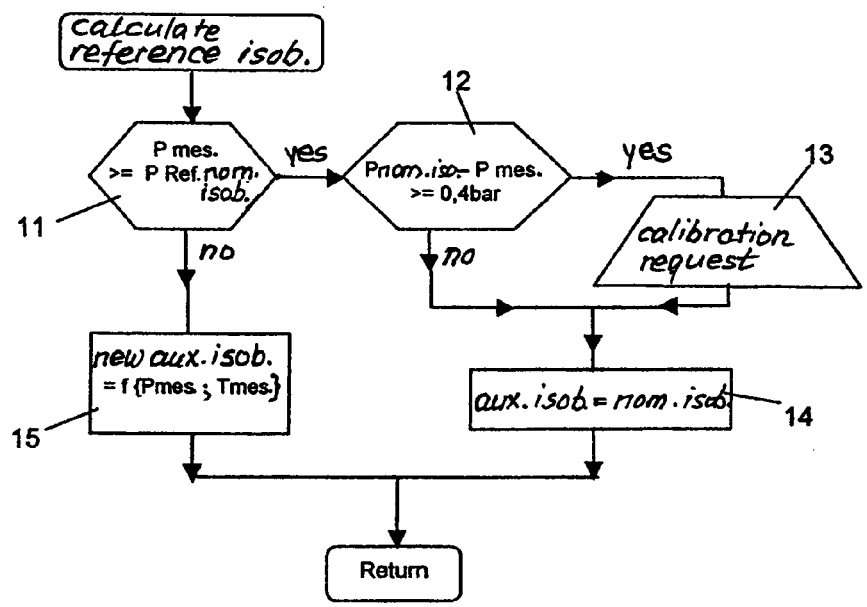
Figure 3:
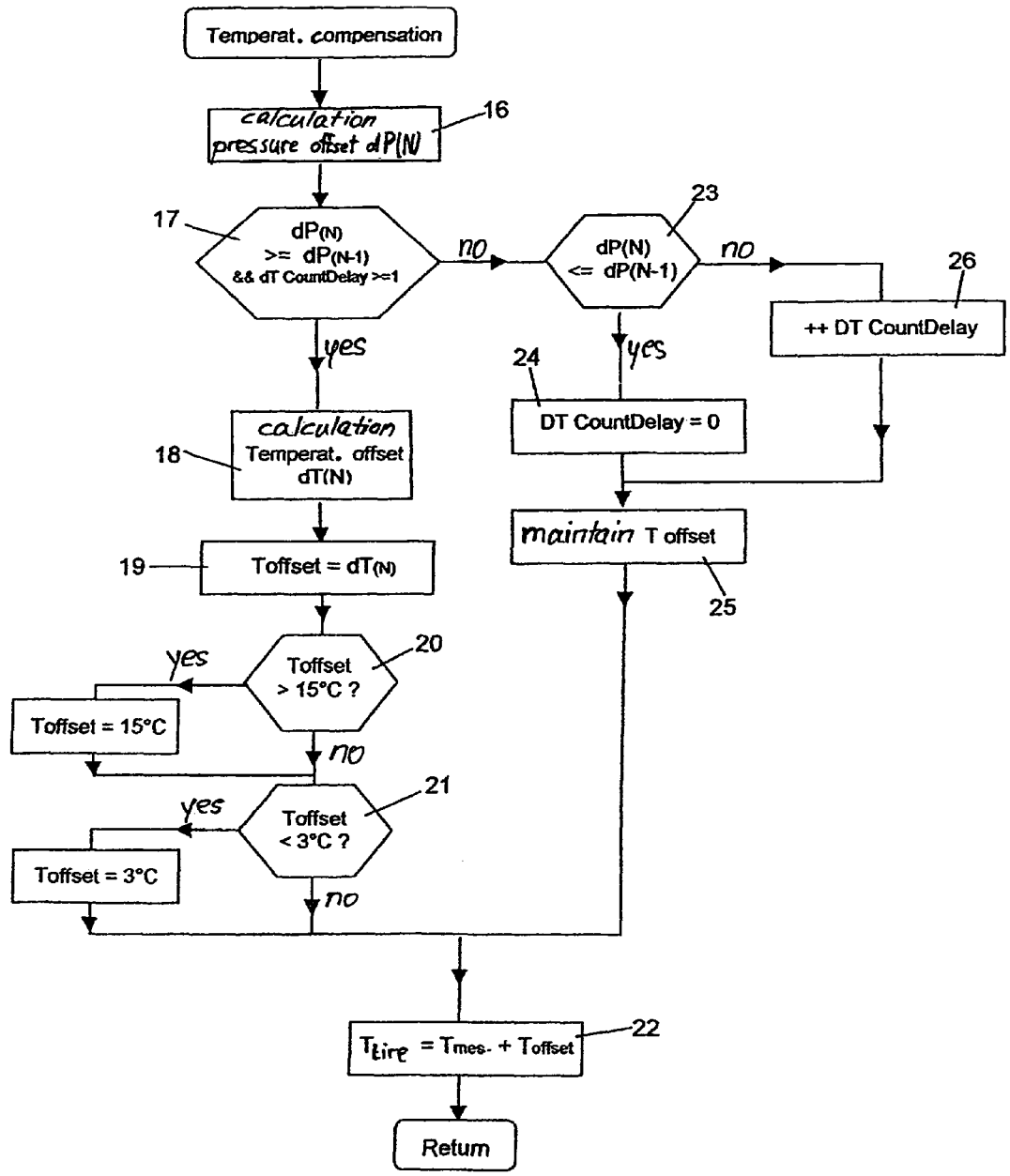

FIG. 1 shows a flow chart of one embodiment of a temperature compensation system for measured pressure values according to the invention, FIG. 2 shows a flow chart of a process of determining a new auxiliary isochore, and FIG. 3 shows a flow chart of the process of temperature compensation of the measured pressure values.

For the temperature compensation it has been assumed that a nominal isochore, representative of the nominal tire pressure, has already been stored in the central control unit of the tire pressure control system. The process starts by switching on the ignition-terminal 15 (T.15)—, see block 1. Thereafter, it is checked if the ignition system has been switched on for the first time after initialization of the central control unit. If this is the case, then the nominal isochore, representative of the nominal tire pressure, is the only one stored in the central control unit up to that moment, and that nominal isochore is selected as the reference isochore. At the same time, a predetermined initial value is activated, see block 3, for a counter in the control unit that defines a time delay at which the correction value for the temperature, derived from the offset between the measured pressure values and the reference isochore (hereinafter referred to as pressure offset), is taken over as the offset rises, see block 3.

If it is not the first time the ignition has been switched on after initialization of the control unit, the system is enquired if at least 30 minutes have passed since the ignition system has been switched off the last time, see block 4; otherwise, the reference isochore present in the control unit is maintained, see block 6. However, if it is 30 minutes or more since the ignition has been switched off the last time, the system is enquired—see block 5—if the difference between the temperature indicated by the temperature sensor of the wheel ($T_{tire}$) and the temperature indicated by the ambient temperature ($T_{outs}$) sensor is not higher than 10 Celsius. If the question is answered in the negative, the reference isochore is maintained, see block 6; however, when the answer is yes, an auxiliary isochore is calculated—see block 7—that passes through the pressure value derived at the measured temperature.

Using that newly calculated auxiliary isochore as a new reference isochore, one then performs a temperature compensation process—see block 8—until the ignition is switched off—see block 9—and the control unit is switched off as well, see block 10, and the reference isochore used last is stored in the control unit.

FIG. 2 illustrates the process of determining a new auxiliary isochore in more detail. In a first step, the system is enquired if the current pressure value is above or on the reference isochore used last. If this is the case, then it can be assumed that no loss of air has occurred since the ignition has been switched off for the last time, and that the reference isochore used last can be used again as reference isochore for temperature compensation purposes—see block 11.

If the measured pressure value is above the reference isochore by more than 400 mbar, see block 12, then it must be assumed that air has been refilled. (n that case, the driver is requested—see block 13—to recalibrate the corresponding wheel or the wheels on the corresponding axle in order to store a nominal isochore, corresponding to the new nominal pressure, in the control unit for the respective wheel. In both cases, when air has been refilled and when no air has been refilled, the reference isochore used last is maintained, see block 14. On calibration, the reference isochore is taken as the new nominal isochore generated by the calibration process.

However, if a comparison between the current measured pressure value and the reference isochore used last shows that the current pressure value is lower than the reference isochore, then an auxiliary isochore is calculated based on the air pressure determined at the measured temperature, see block 15, which is then used as a new reference isochore instead of the precious reference isochore.

The process of temperature compensation of the measured pressure values is illustrated in FIG. 3 by way of example. Once the temperature compensation process has been called up, the pressure offset of the measured pressure value relative to the reference isochore is calculated as a first step, see block 16.

In a next step is it checked if the pressure offset is greater than the pressure offset of the last measured pressure value received before, and if a flag has been set for the delay in accepting the correction value of the temperature of the respective wheel (see block 17). If both conditions are met, the correction value of the temperature, associated to the currently measured pressure value, is calculated—see block 18—and is stored for the respective wheel in the central control unit—see block 19—whereafter another check is carried out to determine if the correction value for the temperature lies between the predefined limits of 15° Celsius—see block 20—and 3° Celsius—see block 21—. Otherwise, the correction value of the temperature is limited to the upper threshold value or to the lower threshold value, respectively. Thereafter, the measured higher temperature, Tmess, is corrected by the correction value, Toffset, with the result that a corrected tire temperature, Treifen, is obtained, see block 22.

However, when after calculation of the pressure offset—block 16—the enquiry if the pressure offset is greater than the pressure offset between the measured pressure values received immediately before, and if the flag for the delay in accepting the correction value of the temperature for the respective wheel has been set, is answered in the negative, it is then checked if the pressure offset of the current measured value is smaller than the pressure offset of the immediately preceding measured value, see block 23. In that case, the flag for the delay in accepting the temperature correction value is reset, see block 24, and the temperature correction value remains at its former value, see block 25. If the pressure offset of the current pressure value is greater than the pressure offset of the preceding pressure value and the flag for the delay has not been set, then the flag for the delay is set—see block 26. The temperature correction value remains at its former value and will be changed at the earliest when the next measured value is received, provided the pressure offset of that value is greater than the current pressure offset.

After setting/resetting of the flag for the delay, the current measured pressure value is corrected using the previous temperature correction value.

The delay in accepting the temperature correction value is intended to prevent that in case of a gradually developing pressure loss the temperature compensation process according to the invention might compensate the gradual pressure loss by continuously reducing the temperature deviation with the result that when the measured pressure values approach the reference isochore an ever smaller temperature offset would be calculated which would be contrary to the object of the present invention.

The invention claimed is:

1. Method for determining air loss from a vehicle tire utilizing a tire parameter monitoring apparatus having temperature and pressure measuring sensors, comprising the steps of:

measuring a regional temperature value and a pressure value to establish a measured regional temperature value and a measured pressure value, establishing a reference isochore for a wheel/tire structure wherein the reference isochore includes a correlation between reference isochore pressure and reference isochore mean gas temperature for a fixed volume of gas in the wheel/tire structure, establishing a measured isochore correlating measured temperatures and measured pressures based upon at least two measured regional temperature values and measured pressure value, establishing a set of calculated offset correction temperature values representing differences between each measured regional temperature value along the measured isochore and reference isochore mean gas temperature value along the reference isochore, for various corresponding pressures, calculating a calculated isochore mean gas temperature value by applying the corresponding offset correction temperature value to a corresponding measured regional temperature value, using the measured isochore to determine a calculated isochore pressure value among a plurality of calculated isochore pressure values at a point along said measured isochore corresponding with said calculated isochore mean gas temperature value, comparing the measured pressure value with the calculated isochore pressure value, further comprising the steps of establishing a state of thermal balance for the wheel/tire structure, and creating at least one new set of calculated offset correction temperature values while a determined difference between the measured pressure values along the measured isochore and calculated reference isochore pressure values is increasing, wherein a loss of gas from the tire is indicated by said measured pressure value being less than said calculated isochore pressure value.

2. Method according to claim 1, wherein the predefined reference isochore is a nominal isochore and is determined when a nominal pressure exists in the vehicle tire at a predefined reference temperature.

3. Method according to claim 1, further comprising the step of fixing an offset correction temperature value for future corrections at a value level corresponding to a point where the difference between the measured pressure values and the calculated reference isochore pressure values stop increasing.

4. Method according to claim 3, further comprising the step of, during a period when a difference between the measured pressure values along the measured isochore and the calculated reference isochore pressure values increases over a predetermined number of successive measurement events, and when the difference between the measured regional temperature values and the reference isochore mean gas temperature values increases after having previously stopped increasing, a new offset correction temperature value is calculated.

5. Method according to claim 3, further comprising the step of, during a period when the difference between the measured pressure values and the calculated reference isochore pressure values increases over a predetermined number of successive measurement events, and when a subsequent increase in the difference between the measured pressure values and the calculated reference isochore pressure values exceeds a predetermined value, and when the difference between the measured temperature values and the reference isochore mean gas temperature values increases after having previously stopped increasing, a new offset correction temperature value is calculated.

6. Method according to claim 3, further comprising the step of, when a subsequent increase in the difference between the measured pressure values and the calculated reference isochore pressure values exceeds a predetermined value and the calculated reference isochore pressure values increases over a predetermined number of successive measurement events, and when the difference between the measured regional temperature values and the reference isochore mean gas temperature values increase after having previously stopped increasing, a new offset correction temperature value is determined.

7. Method according to claim 1, further comprising the step of determining a state of thermal balance in the vehicle tire after an ignition system of the vehicle has been in an off condition for a specified time period.

8. Method according to claim 1, further comprising the step of determining a state of thermal balance is the vehicle tire when a difference between a temperature value measured outside the tire and a temperature value measured inside the tire drops below a predetermined threshold value.

9. Method according to claim 1, further comprising the step of developing an auxiliary isochore, when the tire has recorded a state of thermal balance, and when at least one of the measured pressure values is lower than the corresponding calculated isochore pressure value, and replacing the previous reference isochore with the auxiliary isochore.

* * * * *